United States Patent [19]

Gunderson

[11] 4,125,097

[45] Nov. 14, 1978

[54] ELECTRONIC IGNITION TIMING ADVANCE CIRCUIT

[75] Inventor: Philip D. Gunderson, Arlington Heights, Ill.

[73] Assignee: Motorola, Inc., Schaumburg, Ill.

[21] Appl. No.: 747,454

[22] Filed: Dec. 3, 1976

[51] Int. Cl.$^2$ ............................. F02P 5/04; F02P 3/06
[52] U.S. Cl. ........................... 123/117 R; 123/117 D; 123/148 E
[58] Field of Search .......... 123/117 A, 117 R, 117 D, 123/146.5 A, 148 E

[56] References Cited

U.S. PATENT DOCUMENTS

| | | | |
|---|---|---|---|
| 3,738,339 | 1/1973 | Huntzinger et al. | 123/117 D |
| 3,749,073 | 7/1973 | Asplund | 123/146.5 A |
| 3,785,356 | 1/1974 | Niemoeller | 123/148 E |
| 3,898,894 | 8/1975 | Aono et al. | 123/117 A |
| 3,910,243 | 10/1975 | Gau et al. | 123/117 R |
| 3,923,022 | 12/1975 | Scholl | 123/117 R |
| 4,020,807 | 5/1977 | Del Zotto et al. | 123/117 R |
| 4,033,305 | 7/1977 | Maioglio et al. | 123/117 R |
| 4,041,912 | 8/1977 | Sessions | 123/117 R |
| 4,059,083 | 11/1977 | Habert | 123/117 R |
| 4,077,372 | 3/1978 | Masta | 123/117 D |

*Primary Examiner*—Charles J. Myhre
*Assistant Examiner*—P. S. Lall
*Attorney, Agent, or Firm*—James W. Gillman; Donald J. Lisa; Phillip H. Melamed

[57] ABSTRACT

An electronic ignition circuit is disclosed which produces a spark timing signal for controlling the firing of the cylinders of an internal combustion engine. A sensor produced input signal having a frequency proportional to engine speed is coupled to an ignition timing means which produces a spark timing signal by controlling the charging and discharging of a capacitor. The produced spark timing signal differs in phase from the input signal as a predetermined function of engine speed and the phase difference preferably varies as function of speed according to a plurality of different slope line segments over a range of engine speeds. An advance means also receives the sensor input signal and produces a digital output signal for the timing means comprising a series of pulses synchronized with the input signal and having predetermined pulse widths related to the magnitude of the vacuum pressure produced by the engine. The ignition timing means charges a capacitor at a first rate during a portion of the period of the input signal, maintains the discharge on the capacitor at a constant level during the existence of the advance pulse and discharges the capacitor at a second rate after the occurrence of the advance pulse. This results in adding a predetermined amount of phase, determined by the magnitude of the vacuum pressure produced by the engine, to the speed dependent phase versus engine speed relationship produced by the ignition timing means.

20 Claims, 5 Drawing Figures

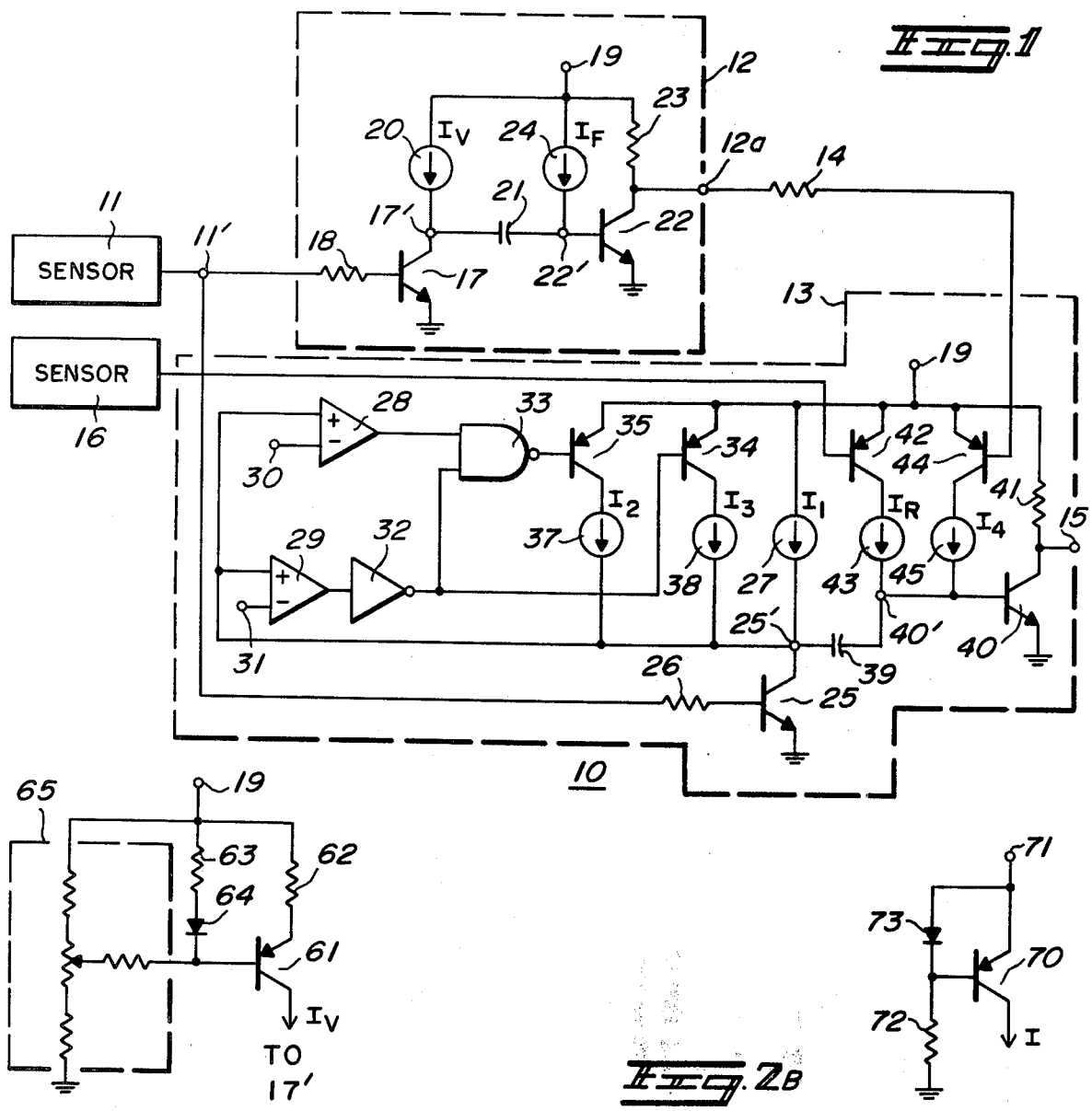
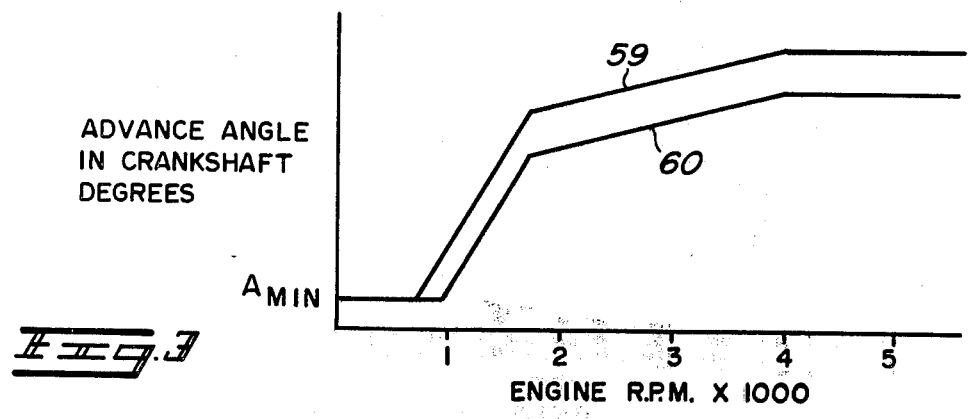

ELECTRONIC IGNITION TIMING ADVANCE CIRCUIT

CROSS REFERENCE TO RELATED APPLICATIONS

The present invention is related to the invention described in the copending U.S. application entitled "An Electronic Spark Timing Adjustment Circuit", Ser. No. 537,726, filed December 31, 1974. In addition, the present invention is also related to the invention described in the copending U.S. application entitled "Multiple Slope Ignition Spark Timing Circuit", Ser. No. 650,655, filed Jan. 20, 1976. Both of the above referred to copending U.S. patent applications are assigned to the same assignee as the present invention.

BACKGROUND OF THE INVENTION

The invention generally relates to the field of ignition spark timing circuits for internal combustion engines. More particularly, the present invention relates to the field of electronic ignition timing advance circuits in which a speed dependent advance angle for a spark timing ignition signal is produced and an advance adjustment for this spark timing signal is provided in accordance with a variable engine condition. In a specific embodiment of the present invention, the variable engine condition corresponds to the magnitude of the vacuum pressure produced by the internal combustion engine.

In standard internal combustion engines, a spark is used to ignite a fuel and air mixture in a cylinder. The proper timing of the occurence of this ignition spark with respect to the compression cycle of the cylinder has generally been difficult to implement in prior art systems. This is because the spark timing which is required for the efficient operation of the engine is generally a complex function of a great number of different engine variables. Primarily, ignition spark timing is a function of the speed of the engine and the engine load, the engine load commonly being sensed by the amount of vacuum pressure produced by the engine. The engine speed is commonly measured in terms of the angular rotational speed of the engine crankshaft in revolutions per minute. The "timing" of the spark ignition signal refers to the time occurrence of a spark timing pulse with respect to a predetermined angular position of the engine crankshaft, the crankshaft angular position corresponding to a specific point in the compression cycle of the cylinders. Thus the term "timing" as used in this specification refers to the time occurrence phase that exists between the occurrence of a spark timing pulse and a predetermined angular position of the engine crankshaft.

Prior art spark timing circuits have generally mechanically created a phase versus engine speed variation for the spark timing signal by using the centrifugal force created by the engine crankshaft rotation to produce a predetermined displacement of a cam which controls the amount of ignition advance. The term "advance" is generally used to describe the phase between the spark timing signal and a predetermined angular position of the engine crankshaft which corresponds to the TDC (top dead center) position of the piston in a cylinder. Typically, "advance" is stated in terms of an "advance angle" which corresponds to the phase difference between the spark timing signal and a reference angular position of the crankshaft given in degrees of crankshaft rotation.

A sensor is generally used to sense the vacuum pressure produced by the engine and this sensor is used to control the physical displacement of a cam which produces a predetermined amount of spark timing advance as a function of engine manifold pressure. Typically this vacuum advance is added to the speed dependent advance determined by the centrifugal force produced by the rotation of the engine crankshaft. This prior art system is generally a totally mechanical system which is extremely complex, difficult to adjust for a specific desired phase versus speed and vacuum characteristic and extremely costly since it includes a large number of mechanical parts which must be precisely manufactured. In addition, the mechanical nature of this system results in an inherent unreliability due to the physical wearing out of the mechanical parts.

Prior art electronic timing circuits do exist and have overcome many of the disadvantages of the mechanical spark timing circuits. Generally, these circuits have been unable to accurately and simply produce a spark timing signal in which a predetermined speed versus phase characteristic is produced which can be readily adjusted in accordance with a variable engine condition, such as engine manifold pressure. This problem is compounded when the desired phase versus speed variation comprises a plurality of different linear variation portions each operative over an associated predetermined range of engine speed.

Generally, it is desirable to produce spark timing signal having a characteristic which has different constant linear rates of change for its advance for a plurality of different speed ranges. Thus a phase versus engine speed characteristic which has the appearance of a piecewise linear graph comprising several line segments is the desired advance characteristic for a spark timing signal. Adjusting this desired speed dependent characteristic by a fixed amount of advance results in complex and costly circuitry according to the teaching of the prior art.

SUMMARY OF THE INVENTION

An object of the present invention is to provide an improved and simplified electronic ignition timing advance circuit for an internal combustion engine.

A more particular object of the present invention is to provide an improved electronic ignition circuit in which a predetermined spark timing phase versus engine speed characteristic is produced by charging and discharging a capcitor and a spark timing advance adjustment is provided according to a variable engine condition by also controlling the charge/discharge of this capacitor.

In one embodiment of the present invention, an electronic ignition timing advance circuit for an internal combustion engine is provided. This circuit basically comprises a sensor, an advance circuit producing pulses having pulse widths related to a variable engine condition and a speed dependent ignition timing circuit for producing a spark timing ignition signal differing in phase from the engine crankshaft angular position as a predetermined function of engine speed. The sensor means produces an input signal having a frequency and period which are proportional to the speed of the engine. The input signal has leading and trailing edges related to the angular positions of the engine crankshaft. The advance circuit is coupled to the sensor for receiving the input signal and produces a digital output signal that consists of a series of advance pulses which are synchronized with the input signal and have predetermined pulse widths related to a variable engine condition, such as the engine manifold pressure. The speed dependent ignition timing circuit also receives the input signal from the sensor and selectively controls the charging and discharging of a capacitor in order to produce a spark timing ignition signal which differs in phase from the input signal as a predetermined function of engine speed. The digital output signal of the advance means is coupled to the speed dependent ignition timing circuit and also results in controlling the charging and discharging of the capacitor in the following manner. The ignition timing circuit alters the charge on the capacitor at a first rate prior to the occurrence of each of the advance pulses. During the advance pulse, the charge on the capacitor is kept constant at the value it had immediately prior to the occurrence of the advance pulse. After each advance pulse, the charge on the capacitor is varied at a second rate. The phase of the spark timing ignition signal with respect to the input signal is determined by the magnitude of the charge on the capacitor at a time subsequent to the occurrence of each advance pulse. Thus the advance pulses effectively delay the transition between the first and second rates and thus provide a spark timing advance adjustment according to the variable engine condition while the speed dependent ignition timing means, which determines the first and second rates, varies the spark timing signal in phase as a predetermined function of engine speed.

Basically, the present invention provides for developing a digital output signal which consists of a series of advance pulses synchronized with the sensor produced input signal. One digital signal pulse occurs during each period of the input signal and the digital pulses have predetermined pulse widths related to the instantaneous magnitude of the engine manifold pressure. A speed dependent ignition timing circuit also receives the sensor input signal and produces a desired spark timing signal phase versus engine speed variation by selectively controlling the charging and discharging of a capacitor. The crux of the present invention is the use of the digital output signal to delay the altering of the charge on the capacitor between a first and second rate by a period of time equal to the width of each advance pulse.

The phase of the spark timing signal produced by the speed dependent ignition timing circuit is related to the charge on the capacitor. The first and second rates for altering the charge on the capacitor are determined by circuit constants in the ignition timing circuit and these rates determine the variation of the spark timing signal phase with respect to engine speed. By delaying the change between the first and second rates of change by a time related to a predetermined amount of desired vacuum spark timing advance, a vacuum spark timing advance adjustment is provided which adds a predetermined amount of phase to the spark timing signal. This is accomplished without changing the first and second rates for altering the charge on the capacitor and without first totally developing an intermediate spark timing ignition signal and then altering the phase of this intermediate signal by a predetermined amount of vacuum advance. Thus the present invention does not provide for changing the rates of altering the charge on the capacitor, which may be hard to implement and may produce undesirable variations in the phase versus speed characteristic. In addition, the present invention does not go to the expense and trouble of producing an intermediate spark timing signal and then combining this intermediate signal through an additional gating device with a vacuum advance signal to produce a composite spark timing signal that has the desired phase versus speed variation along with the desired phase versus vacuum pressure variation.

The specific circuitry illustrated in the preferred embodiment of the present invention illustrates the invention in the context of an ignition timing advance circuit in which a plurality of engine speed ranges exist during which different linear phase versus speed relationships exist. Thus the specific embodiment of the present invention provides for sequentially charging a capacitor in the speed dependent ignition timing circuit at up to three different charging rates, maintaining the charge on the capacitor constant during each of the advance pulses produced by the vacuum advance circuit and discharging the capacitor at a fourth predetermined rate. When the discharging of the capacitor results in producing a voltage equal to a predetermined minimum threshold, the leading edge of the spark timing ignition signal is produced. In this manner, an advance versus speed characteristic for the spark timing ignition signal is produced in which a plurality of engine speed ranges exist during which the phase versus speed variation is according to a different linear constant of proportionality and in which the absolute magnitude of the phase can be varied in accordance with the vacuum pressure of the engine without changing the slope of the phase versus engine speed variation. This results in a simplified and improved electronic ignition timing circuit.

BRIEF DESCRIPTION OF THE DRAWINGS

For a more complete understanding of the invention reference should be made to the drawings, in which:

FIG. 1 is a combined block and schematic diagram of an electronic ignition timing advance circuit for an internal combustion engine which embodies the present invention;

FIGS. 2A and 2B are schematic diagrams illustrating typical embodiments of block diagrammed current sources which are illustrated in FIG. 1;

FIG. 3 is a graph illustrating two advance angle (phase) versus engine speed characteristic produced by the circuit shown in FIG. 1.

DESCRIPTION OF THE PREFERRED EMBODIMENT

Figure 4:
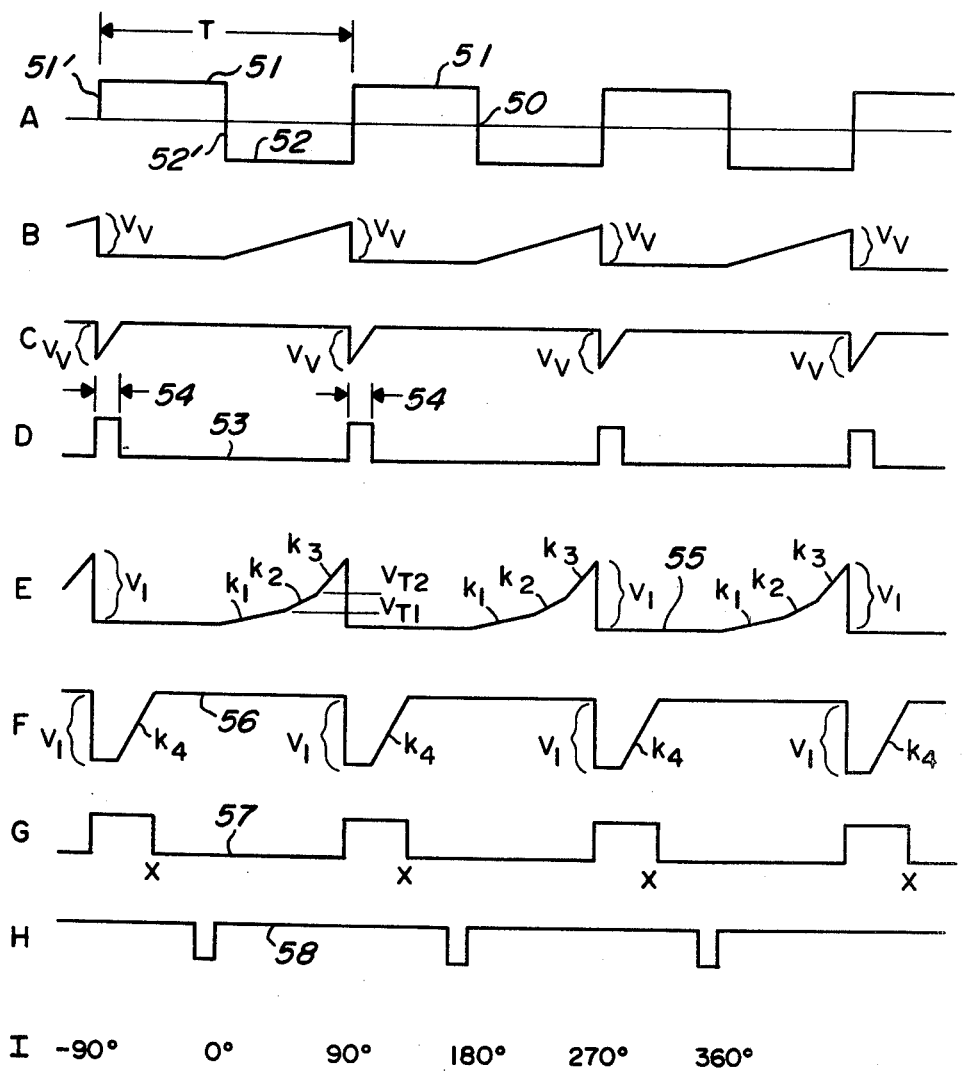
FIG. 4 is a series of graphs illustrating various signal waveforms produced by the circuit shown in FIG. 1.

FIG. 1 illustrates an electronic timing ignition advance circuit 10 for an internal combustion engine (not shown). Basically, the circuit 10 comprises a sensor 11, an advance circuit 12 (shown dashed), a speed dependent ignition timing circuit 13 (shown dashed), and a resistor 14 coupling an output terminal 12a of the advance circuit 12 to the ignition timing circuit 13. Both the advance circuit 12 and the ignition timing circuit 13 are coupled to an output terminal 11' of the sensor 11 and the ignition circuit 13 produces a spark timing ignition signal at an output terminal 15. The spark timing ignition signal has a predetermined phase versus engine speed characteristic with respect to an output signal produced by the sensor 11 and coupled to both the advance circuit 12 and the circuit 13. The phase versus speed characteristic of the spark timing signal will be discussed in detail subsequently. The circuit 10 also includes another sensor 16 which is coupled to the speed dependent ignition timing circuit 13.

The sensors 11 and 16 both produce AC output signals having a frequency and period proportional to the rotational speed of the crankshaft of the engine (not shown). These AC signals have alternate positive and negative cycles with respect to some predetermined DC reference level and the leading and trailing edges of these AC signals correspond to predetermined rotational positions of the engine crankshaft. The sensors 11 and 16 are contemplated as being magnetic pick up devices or Hall sensors which have signals induced in them by the rotation of the engine crankshaft. These sensors are well known in the field of electronic ignition systems. The sensors 11 and 16 have active sensor areas located at predetermined angular positions with respect to an axis of rotation of a body being actuated in synchronization with the engine crankshaft. The sensor 16 is positioned at a different angular position than the sensor 11 with respect to the engine crankshaft such that the leading and trailing edges of the signal produced by the sensor 16 do not coincide with the edges of the signal produced by the sensor 11. Thus the sensor 16 signal represents a device which produces a signal having a fixed phase angle (in degrees of crankshaft rotation) with respect to the signal produced by the sensor 11. The significance of this will be discussed subsequently.

The advance circuit 12 includes an NPN transistor 17 having its base coupled to the sensor terminal 11' through a resistor 18, its emitter connected to ground and its collector directly connected to a terminal 17' and coupled to a positive voltage supply terminal 19 through a vacuum current source 20. The magnitude of the current supplied by the source 20 is designated as $I_V$. Similar notation will be used for all current sources. The current source 20 represents a constant current source that produces a current directly related to the magnitude of the vacuum pressure produced by the engine which the circuit 10 supplies spark timing ignition signals for. A typical embodiment for this current source is illustrated in FIG. 2A and will be discussed subsequently.

An auxiliary capacitor 21 is coupled between the terminal 17' and a terminal 22' that is at the base of an NPN transistor 22 which has its emitter coupled directly to ground and its collector directly coupled to the terminal 12a and coupled through a resistor 23 to the positive supply terminal 19. A fixed value constant current source 24 ($I_F$) is illustrated as being coupled between the terminal 19 and the base of the transistor 22. The components 17 through 24 basically comprise the advance circuit 12 with the current source 20 providing a dynamically variable constant current related to the magnitude of the engine vacuum pressure and the current source 24 providing a fixed amount of current. The advance circuit 12 basically receives an input signal from the sensor 11 via terminal 11' and produces a digital output signal comprising a series of advance pulses synchronized with the input signal and having predetermined pulse widths related to the engine vacuum pressure. The operation of the circuit 12 will be discussed in detail subsequently.

The speed dependent ignition timing circuit 13 includes an NPN transistor 25 having its base coupled to the terminal 11' through a resistor 26, its emitter directly connected to ground and its collector directly coupled to a terminal 25'. The terminal 25' is coupled to the positive supply terminal 19 through a constant current source 27 which is designated as $I_1$. The terminal 25' is also coupled to the positive input terminals of a first comparator 28 and a second comparator 29. The negative input terminal of the comparator 28 is connected to a DC reference terminal 30 and the negative input terminal of the comparator 29 is connected to a DC reference terminal 31. The comparators 28 and 29 are standard electrical components well known to those of average skill in the art. Each comparator provides a high output logic state when the voltage present at its positive input terminal exceeds the voltage at its negative input terminal and a low output logic state is provided when the reverse is true.

The output of the comparator 29 is coupled through an inverter 32 to one input terminal of a NAND gate 33 which has another input directly connected to the output of the comparator 28. The inverter 32 also supplies the inverted output of the comparator 29 to the base of a PNP transistor 34 and the output of the NAND gate 33 is coupled to the base of a PNP transistor 35. The transistors 34 and 35 have their emitters directly connected to the power supply terminal 19. The collector of the transistor 35 is coupled to the terminal 25' through a constant current source 37 ($I_2$), while the collector of the transistor 34 is coupled to the terminal 25' through a constant current source 38.

The terminal 25' is coupled through a capacitor 39 to a terminal 40' at the base of an NPN transistor 40 which has its emitter directly connected to ground and its collector directly coupled to the output terminal 15 and coupled through a resistor 41 to the positive supply terminal 19. The sensor 16 is coupled to the base of a PNP transistor 42 which has its emitter directly connected to the terminal 19 and its collector coupled to the terminal 40' through a constant current source 43 ($I_R$). A PNP transistor 44 has its base coupled to the terminal 12a through the resistor 14, its emitter directly connected to the terminal 19 and its collector coupled through a constant current source 45 ($I_4$) to the base of the transistor 40. The components 25 through 45 generally comprise the speed dependent ignition timing circuit 13 which receives an input signal from the sensor terminal 11' and produces a spark timing ignition signal at the terminal 15 by selectively controlling the charging and discharging of the capacitor 39.

The operation of the advance circuit 12 and the speed dependent ignition timing circuit 13 will now be discussed in detail with specific reference to the signal waveforms illustrated in FIG. 4 and the advance angle versus speed characteristics shown in FIG. 3. Subsequently, the typical embodiments of the current sources illustrated in the FIGS. 2A and 2B will be discussed.

The sensor 11 basically senses the angular rotational position of the engine crankshaft and produces an input signal at the terminal 11' which has a frequency and period that are proportional to the speed of the engine. FIG. 4A illustrates a signal 50 having a time period T which represents a typical signal produced by the sensor 11 for a given engine speed. The signal 50 is shown as having a positive cycle 51 and an equal duration negative cycle 52 which comprise the period T, although equal duration is not required for the present invention. The leading and trailing edges (51' and 52', respectively) of the signal 50 correspond to predetermined angular positions of the engine crankshaft. The signal waveforms illustrated in FIGS. 4A—4H all have the vertical axes representative of the magnitude of a signal and the horizontal axes are all representative of time and are drawn with the same time scale. FIG. 4I merely correlates the horizontal time axes to degrees of engine crankshaft rotation for the example of a four cylinder four cycle engine.

The signal 50 is received by the transistor 17 in the advance circuit 12 and results in turning on and saturating the transistor 17 during the positive cycle 51 and turning off the transistor 17 during the negative cycle 52. FIG. 4B illustrates the voltage signal developed at the terminal 17' due to the switching of the transistor 17. During the time that the transistor 17 is saturated the voltage at its collector (terminal 17') is maintained at approximately ground potential. When the transistor 17 is turned off during the negative cycle 52, the vacuum current source 20 proceeds to charge up the capacitor 21 until the transistor 17 is again turned on by the next positive cycle 51 of the signal 50. The peak value that the voltage at the terminal 17' reaches is designated as $V_V$ and this voltage is related to the duration of the negative cycle 52 as well as the magnitude ($I_V$) of the current supplied by the vacuum current source 20 and the magnitude of the capacitor 21.

FIG. 4C illustrates the signal present at the base of the transistor 22 (terminal 22') when the signal 50 is applied to the base of the transistor 17. FIG. 4C illustrates that when the terminal 17' is shorted to ground by the occurrence of a positive cycle 51 of the signal 50, a negative spike will be created at the terminal 22' which will turn off the transistor 22 and keep this transistor off until the current source 24 discharges the capacitor 21 such that a positive voltage is present at the base of the transistor 22 which will turn on this transistor. The magnitude of the negative spike present at the terminal 22' is identical to the magnitude of the positive voltage present at the terminal 17' immediately before the occurrence of the positive cycle 51 of the signal 50.

FIG. 4D illustrates a digital output signal 53 produced at the collector of the transistor 22 and this is also the signal at the output terminal 12a of the advance circuit 12. During the time that the transistor 22 is on, the signal at the terminal 12a is at almost ground potential since the transistor is saturated. The occurrence of a positive cycle 51 of the signal 50 creates a negative spike at the base of the transistor 22, since the charge across a capacitor cannot be altered instantaneously, and this results in turning off the transistor until the current source 24 discharges the capacitor 21 such that a positive voltage is once more obtained at the base of the transistor 22 to turn this transistor on. The rate of discharge of the capacitor 21 is controlled by the magnitude of the current supplied by the current source 24 ($I_F$) which has a fixed magnitude. The fact that the current sources 20 and 24 are constant current sources results in having a linear rate of rise for the signals illustrated in FIGS. 4B and 4C.

It can be shown that the signal 53 illustrated in FIG. 4 is a digital signal consisting of a series of pulses produced in response to the signal 50 and that these pulses have pulse widths 54 which are related to the magnitude of the current supplied by the vacuum current source 20 which controls the rate of rise of the voltage present at the terminal 17'. This is explained in detail in a copending U.S. patent application to Chi Sun Lai and Philip D. Gunderson entitled "An Electronic Spark Timing Adjustment Circuit", Ser. No. 537,726, filed December 31, 1974. The copending patent application referred to clearly illustrates that the pulse widths 54 of the signal 53 are related to the ratios of the currents supplied by the sources 20 and 24 which control the rate of change of the signals illustrated in FIG. 4B and 4C. When $I_F$ is constant and $I_V$ varies as a function of vacuum pressure, the copending patent application also illustrates that the pulse widths 54 of the signal 53, while varying in absolute time duration as a function of the speed of the engine, will remain a predetermined proportion of the period T of the signal 50 produced by the sensor 11. Thus the pulse widths 54 of the signal 53 represent a speed independent constant vacuum advance angle, as measured in degrees of crankshaft rotation, wherein the constant advance angle is proportional to the magnitude of the engine vacuum pressure. The digital output signal 53 is then coupled to the speed dependent ignition timing means 13 to produce an effective delay in the circuit 13 and thereby implement a speed independent vacuum advance angle timing adjustment for the speed dependent spark timing signal produced by the circuit 13. The operation of the circuit 13 and its interaction with the digital signal 53 will now be explained in detail.

The input signal 50 is received by the transistor 25 at its base and results in turning on this transistor during the positive cycle 51 and turning off this transistor during the negative cycle 52. FIG. 4E illustrates a signal 55 which is present at the terminal 25' which corresponds to the collector of the transistor 25. During the positive cycle 51, the voltage at the terminal 25' will be held at substantially ground potential since the transistor 25 will be saturated. Immediately upon the commencement of the negative cycle 52, the voltage at the terminal 25' will rise at a linear slope $k_1$ which is determined by the magnitude of the constant current source 27 ($I_1$) and the capacitance of the capacitor 39. When the signal 55 at the terminal 25' exceeds a first threshold voltage VT1, which is equal to the voltage at the reference terminal 30, the comparator 28 will produce a high logic signal that will be coupled to the NAND gate 33. At this time, the NAND gate will also be receiving a high logic signal from the inverter 32 because the output of the comparator 29 will be low since the potential at the reference terminal 31 is equal to a larger positive potential VT2. Thus when the voltage at the terminal 25' exceeds the threshold voltage VT1, the NAND gate 33 will produce a low voltage at its output and turn on the transistor 35. This results in effectively turning on the current source 37 so that the voltage at the terminal 25' now varies at a rate depending upon the combined current supplied by the current sources 27 and 37. This combined rate of change is a function of $I_1 + I_2$ and is illustrated by the slope $k_2$ shown in FIG. 4E.

When the voltage at the terminal 25' exceeds the threshold voltage VT2, the comparator 29 will produce a high logic signal that results in turning off the transistor 35 and turning on the transistor 34. This means that the voltage at the terminal 25' will now increase at a rate determined by the combined current of the sources 27 and 38. This new rate of change is a function of $I_1 + I_3$ and is illustrated by the slope $k_3$ in FIG. 4E. Thus the signal 55, as illustrated in FIG. 4E for a specific engine speed, has its magnitude sequentially varied at three predetermined different rates ($k_1$–$k_3$) throughout the negative cycle 52 of the signal 50. Just prior to the occurrence of the positive cycle 51, the signal 55 is illustrated as having a positive magnitude $V_1$.

Upon the occurrence of the positive cycle 51 the voltage at the terminal 25' is immediately reduced to approximately ground potential and held there for the duration of the positive cycle. This results in producing a signal 56 with a negative spike having a magnitude of $V_1$ at the base of the transistor 40. This signal is illustrated in FIG. 4F. During the positive cycle 51, the signal 53 at the terminal 12a will initially turn off the transistor 44 by applying a high voltage to its base for the duration of the pulse width 54. This effectively prevents the current source 45 from altering the charge on the capacitor 39 until after the duration of the pulse width 54. Subsequent to the existence of the pulse width 54, the transistor 44 will be turned on by the signal 53 and the signal 56 will increase at a linear slope $k_4$, a function of $I_4$, from its value of $-V_1$ up to a potential which will turn on the transistor 40. Thus connecting the base of the transistor 44 to the terminal 12a has resulted in utilizing the digital output signal 53 from the vacuum advance circuit 12 to effectively delay the transistion between altering the charge on the capacitor 39 at the rate of $k_3$ and altering the charge on the capacitor at the rate of $k_4$.

Producing the signal 56 at the base of the transistor 40 results in the production of a signal 57, illustrated in FIG. 4G, at the terminal 15, which corresponds to the collector of the transistor 40. The signal 57 represents the spark timing ignition signal produced by the circuit 13. The signal 57 maintains a high voltage for the duration of the pulse width 54 and also for the time required for the signal 56 to decay at a rate of $k_4$ until a voltage is reached that will turn on the transistor 40. During the remainder of the period T after the transistor 40 is turned on, the signal 57 is maintained at a low voltage level due to the saturation of the transistor 40. Applying the signal 57 to a transistor switched spark ignition coil will result in producing a spark ignition at the high voltage to low voltage transition of the signal 57 and this transition is designated by the letter X in FIG. 4G. The phase or advance angle of the spark timing signal 57 is measured from the transition X to the transition 52' of the input signal 50.

By comparing the signals illustrated in FIGS. 4A through 4G, it can be seen that the time occurrence of a spark timing ignition at the positive to negative transition X is a function of the pulse width 54, the magnitude $V_1$ (which is determined by the slopes $k_1$, $k_2$ and $k_3$) and the slope $k_4$. The transitions between the slopes $k_1$, $k_2$ and $k_3$ occur at predetermined fixed time intervals since (1) the signal 55 is held at a constant value (ground) during the positive cycle 51, (2) the rates of change of the signal 55 are constant (due to the fact that fixed value current sources are being used), and (3) the reference voltages at the terminals 30 and 31 are constant. If the base of the transistor 44 were maintained at a relatively low voltage throughout all of the positive cycle 51, no effective delay would be provided during the transistion between the charge altering rate $k_3$ and the charge altering rate $k_4$. This would result in a circuit which would be similar in its operation to the circuitry shown in a copending application to Kenneth Padgitt entitled "Multiple Slope Ignition Spark Timing Circuit", Ser. No. 650,655, filed Jan. 20, 1976 and assigned to the same assignee as the present invention. This copending application illustrates that changing the charge altering rates for a capacitor at predetermined fixed time intervals, where the time intervals do not vary as a function of the rotational speed of the engine, will result in producing an ignition signal having an advance angle versus speed characteristic which generally has a piecewise linear appearance. This is caused by the fact that at some engine speeds some of the time deductions which initiate the change from one charging rate for the capacitor 39 to another may not occur. In other words at some speeds the signal 55 may never attain a magnitude greater than VT1 or VT2. Since the advance angle versus speed characteristic is a function of all of the slopes actually used to alter the charge on the capacitor 39 during any one period, this results in altering the advance angle versus speed characteristic. The referred to copending application explains in detail the operation of the multiple slope segments $k_1$, $k_2$ and $k_3$ and how these slope segments can produce a piecewise linear advance angle versus speed characteristic.

The above referred to patent application does implement a vacuum advance adjustment, however this is not accomplished by delaying any of the transitions between the charge altering rates by a speed independent amount of advance angle. The Pagditt application produces a vacuum advance by simultaneously altering all of the slopes $k_1$ through $k_4$ by a uniform amount. While this does provide a vacuum advance adjustment, this slope modulation in accordance with the engine vacuum pressure may not always be desirable. The present invention by way of contrast provides a similar end result by a totally different and unobvious circuit in which none of the capacitor charge altering slopes, as represented by slopes $k_1$ through $k_4$, are ever changed. Thus the present invention minimizes the possibility of the vacuum advance circuit unintentionally changing the advance angle versus speed variation, since the slopes $k_1$ through $k_4$, which determine this variation, are never changed. This provides an improved electronic ignition timing advance circuit.

While the above referred to Padgitt patent application does explain in detail the operation of the present circuit as far as its production of a piecewise linear advance angle versus speed characteristic, the following comments may clarify the operation of the present circuit. For very high speeds, the absolute magnitude of the period T will be extremely small. At these high speeds, a positive cycle 51 will follow so closely to the occurrence of a negative cycle 52 that the signal produced at terminal 25' (which corresponds to signal 55) will reach its peak magnitude during the initial charging segment $k_1$, and this peak magnitude will be below the first threshold VT1. Thus the phase between the spark timing ignition signal 57 and the input signal 50 will not be a function of the slopes $k_2$ and $k_3$ at these high speeds. At slightly slower speeds the signal corresponding to signal 55 may exceed the threshold VT1 during the negative cycle 52, but may not exceed the threshold VT2. At these speeds the phase of the signal corresponding to the signal 57 will be a function of the slopes $k_1$ and $k_2$, but not of the slope $k_3$. Thus a different advance angle (phase) versus speed relationship will exist for this range of speeds. In this respect, the present invention is similar to that shown in the copending Padgitt application.

The present invention provides for the sensor 16 producing a signal 58 having a fixed angular phase relationship with respect to the input signal 50 produced by the sensor 11. This signal is illustrated in FIG. 4H. The signal consists of a voltage which is maintained at a high level except for a fixed amount of advance angle, in crankshaft degrees prior to the occurrence of the transition 52' from a positive cycle 51 to the negative cycle 52.

The signal 58 is coupled to the base of the transistor 42. When the signal 58 has a low potential, the transistor 42 will be turned on and effectively connect the current source 43, having a substantially higher magnitude of current ($I_R$) relative to the current sources $I_1$ through $I_4$, to the capacitor 39. This insures that no matter how high the magnitude of the voltage $V_1$ produced by the signal 55 is and no matter what angular advance is called for by the vacuum advance circuit 12, a spark will always occur at least at a minimum constant advance angle determined by high to low transition of the signal 58 produced by the sensor 16. Thus the current source 43 acts as a reset apparatus and also provides a minimum advance angle for the spark timing signal.

FIG. 4I is a scale which plots the advance angle in crankshaft degrees for all of the various signals illustrated in FIGS. 4A through 4H for the example of a four cylinder four cycle engine. All of these signals have been drawn on an identical time scale for one typical engine speed so that the phases of the different signals can be readily compared.

FIG. 3 illustrates the advance angle, in crankshaft degrees, of the spark timing signal 57, shown in FIG. 4G for one engine speed, as a function of the engine speed. Two advance angle characteristics 59 and 60 are illustrated to show the effect of different engine vacuum pressures on the advance angle versus speed characteristic.

The characteristic 60 has a constant amount of angular advance for engine speeds above 4000 rpm. At these speeds, the occurrence of a spark ignition is only a function of the slopes $k_1$ and $k_4$, since the signal corresponding to the signal 55 never reaches a magnitude above the first threshold VT1. The Chi Sun Lai and Philip Gunderson copending application referred to above teaches that when a single charging and single discharging slope is used to determine the phase of an ignition timing signal, it is possible to produce this signal such that a constant amount of angular phase exists independent of the speed of the engine. In fact, this principle is what provides the constant amount of speed independent angular phase for the vacuum adjusting advance signal 53 that is produced by the circuit 12. For engine speeds between 1600 and 4000 rpm, the characteristic 60 is determined by the slopes $k_1$, $k_2$, and $k_4$. This results in providing a linear advance angle versus engine speed variation. For speeds between 1000 rpm and 1600, the slope $k_3$ will also affect the variation of the spark timing signal advance angle versus engine speed. For speeds below 1000 rpm, for a fixed amount of vacuum advance called for by the signal 53, the signal 58 will produce a constant minimum amount of angular advance for the spark timing signal 57 which will be speed independent. This minimum angular advance is designated as $A_{min}$.

The characteristic 59 illustrates the type of advance angle versus engine speed variation which will exist when a larger amount of advance angle, than that which produced the characteristic 60, is called for by the advance circuit 12. For speeds greater than 1000 rpm, the characteristic 59 varies identically with the characteristic 60 as a function of speed, except the characteristic 59 is shifted upward by a constant amount of angular advance which corresponds to the additional angular advance required for an engine vacuum pressure that is greater than the engine vacuum pressure advance that created the characteristic 60. For speeds below 1000 rpm, the characteristics 59 will vary at the same rate as it did for speeds just above 1000 rpm until the minimum advance level $A_{MIN}$ is reached, which will occur at a speed around 700 rpm. Thus the present invention has provided a minimum amount of phase or angular advance which must exist between the spark timing ignition signal and the input signal regardless of the vacuum pressure and the engine speed, and this is accomplished in the present invention by the use of the sensor 16.

FIG. 2A illustrates a typical embodiment of the vacuum constant current source 20. The current source is illustrated as comprising a PNP transistor 61 having its emitter connected to the positive supply terminal 19 through a resistor 62 and its base coupled to the terminal 19 through a resistor 63 in series with a diode 64, the cathode of the diode 64 being directly connected to the base of the transistor 61. A potentiometer assembly 65 is illustrated as comprising a resistive element connected between the power supply terminal 19 and ground with a variable center tap resistance arm connected to the base of the transistor 61. The potentiometer assembly and variable resistor arm represent a vacuum pressure transducer which provides a variable biasing voltage for the base of the transistor 61. The collector of the transistor 61 is indicated as being connected to the terminal 17' and providing the current $I_V$.

The circuitry illustrated in FIG. 2A operates as follows. In response to changes in the engine vacuum pressure, the potentiomemter 65 produces a different biasing voltage at the base of the transistor 61. This results in altering the constant amount of current $I_V$ supplied to the terminal 17' by the transistor 61. The collector current of the transistor 61 is equal to $I_V$ and will be equal to the potential difference between the terminal 19 and the base potential at the transistor 61, minus the emitter-base voltage drop of transistor 61, divided by the resistance of the resistor 62. Thus changes in the vacuum pressure of the engine will result in changing the magnitude of the current supplied by the transistor 61 to the terminal 17'.

FIG. 2B illustrates a typical embodiment for any one of the current sources $I_1$ through $I_4$, $I_F$ or $I_R$. In this case a PNP transistor 70 has its emitter directly connected to a source of positive potential 71 and its base connected to ground through a resistor 72 and to its emitter through a diode 73 having its cathode connected to the base. The collector of the transistor 70 is indicated as being connected to the circuit element that the current source is to deliver current to. Basically, the voltage drop across the diode 73 is used to bias the transistor 70 and the transistor output current (I) will therefore be substantially proportional to the diode current. Thus the circuit in FIG. 2B merely applies a constant amount of current which is determined by the potential at the terminal 71 and the resistance of the resistor 72. This occurs because of a current mirror effect which is well known to those of average skill in the art and does not form part of the present invention. For the current source 24, for example, the terminal 71 is identical with the terminal 19 and the collector of the transistor 70 is connected to the terminal 22'. For the current source 45, the terminal 71 corresponds to the collector of the transistor 44 and the collector of the transistor 70 is connected to the base of the transistor 40.

The FIGS. 2A and 2B merely represent typical embodiments of current sources which may be used for any of the current sources illustrated in the ignition spark timing circuit 10 shown in FIG. 1. While I have shown and described specific embodiments of this invention further modifications and improvements will occur to those skilled in the art. One such modification would be to make the current source 20 depend upon an engine variable other than the vacuum pressure. Another such modification would be to make the current source 20 depend upon a variable which does vary in accordance with the speed of the engine. All such modifications which retain the basic underlying principles disclosed and claimed herein are within the scope of this invention.

I claim:

1. An electronic ignition timing advance circuit for an internal combustion engine, comprising:
    sensor means for providing an input signal having a frequency and period which are proportional to the speed of an engine, the input signal having leading and trailing edges related to predetermined angular positions of the engine crankshaft;
    advance means coupled to said sensor means for receiving said input signal and producing a digital output signal comprising a periodic series of advance pulses, each advance pulse being synchronized with respect to at least one of said leading and trailing edges of said input signal and have a predetermined pulse width related to a variable engine condition;
    speed dependent ignition timing means coupled to said sensor means for receiving said input signal and producing, by periodically selectively controlling the rates of change of a signal stored in a device during a predetermined amount of angular crankshaft rotation and utilizing the magnitude of said stored signal, a digital spark timing ignition signal differing in phase from at least one of the leading and trailing edges of said input signal as a predetermined function of engine speed determined by said rates of change; and
    means coupled between said advance means and said speed dependent ignition timing means for coupling said advance pulses to said timing means for adjusting said spark timing ignition signal;
    said ignition timing means including first means for altering the magnitude of said stored signal at at least a first rate prior to the occurrence of each of said advance pulses, second means for maintaining the magnitude of said stored signal constant at its last previous value prior to the occurrence of the advance pulses during the advance pulses, and third means for altering the magnitude of said stored signal at a second rate after the occurrence of the advance pulses, whereby the advances pulses effectively delay the transition between said first and second rates and thereby provide a spark timing advance adjustment for the speed dependent spark timing signal according to said variable engine condition.

2. An electronic ignition timing advance circuit according to claim 1 wherein said ingition timing means includes a comparator means for comparing the magnitude of said stored signal with a reference level and producing said digital spark timing signal as a function of the output of said comparator.

3. An electronic ignition timing advance circuit according to claim 1 wherein said first and second rates of change have different polarities.

4. An electronic ignition timing advance circuit according to claim 1 wherein said device comprises a capacitor and said stored signal corresponds to the charge on said capacitor.

5. An electronic ignition timing advance circuit according to claim 1 wherein said input signal has alternate positive and negative cycles with respect to a predetermined reference level and wherein said speed dependent ignition timing means changes the rate of altering the charge on said capacitor within a first predetermined amount of angular rotation of the engine after the commencement of one of said positive and negative cycles of said input signal, said speed dependent ignition timing means altering the charge on said capacitor at the first rate during said one of said positive and negative cycles and then altering the charge of the capacitor at a third rate during said one of said positive and negative cycles in response to the detecting of the passage of a first predetermined period of time within said first predetermined amount of angular rotation, whereby the phase between the spark timing signal and the input signal is a first function of engine speed for speeds below a predetermined engine speed and this phase is a second function of engine speed for speeds above this predetermined speed.

6. An electronic ignition timing advance circuit according to claim 5 wherein said speed dependent ignition timing means includes a first current source for altering the charge of the capacitor at the first rate in response to the commencement of said one of the positive and negative cycles of the input signal, and wherein said timing means includes a second current source for altering the charge on the capacitor at the third rate in response to a voltage on one terminal of the capacitor exceeding a predetermined magnitude, whereby the voltage at this one terminal of the capacitor is used for detecting the passage of said first predetermined period of time.

7. An electronic ignition timing advance circuit according to claim 6 wherein said dependent ignition timing means includes a third current source for altering the charge on the capacitor at the second rate during the other one of the positive and negative cycles of the input signal subsequent to the one of the positive and negative cycles during which the capacitor charge was being altered at said first and third rates.

8. An electronic ignition timing advance circuit according to claim 7 wherein said first and third rates of altering the charge of the capacitor have the same polarity and are substantially constant, and the second rate of altering the charge of the capacitor has a polarity opposite to that of the first and third rate and is also substantially constant.

9. An electronic ignition timing advance circuit according to claim 8 wherein said advance pulses coincide in their occurrence with the commencement of said other one of said cycles of said input signal.

10. An electronic ignition timing advance circuit according to claim 9 wherein said advance means includes a first device being switched on and off by the alternate cycles of said input signal, an auxiliary capacitor coupled to said first device and a second switching device coupled to said first device through said auxiliary capacitor, said variable engine condition controlling the rate of altering the charge on said auxiliary capacitor during one of the positive and negative cycles of said input signal, said advance means, during the other one of said cycles of said input signal, keeping said second switching device in an operative state for a predetermined proportion of the period of the input signal, the predetermined proportion being determined by said variable engine condition.

11. An electronic ignition timing advance circuit according to claim 10 wherein said advance means includes a current source for altering the charge on the auxiliary capacitor at a substantially constant rate according to the variable engine condition.

12. An electronic ignition timing advance circuit according to claim 11 wherein said variable engine condition is the magnitude of the vacuum pressure produced by the engine and wherein the rate at which the charge on the auxiliary capacitor is altered by said current source is determined by the magnitude of the vacuum pressure.

13. An electronic ignition timing advance circuit according to claim 12 which includes an additional sensor means for providing a pulse during one of the positive and negative cycles of said input signal, said additional sensor means being coupled to said speed dependent ignition timing means and said pulse from said additional sensor means being utilized by said ignition timing means for providing a minimum possible difference in phase between said spark timing ignition signal and said input signal, whereby a minimum amount of phase exists between the spark timing ignition signal and the input signal regardless of the variable engine condition and the engine speed.

14. An electronic ignition timing advance circuit according to claim 13 wherein said sensor means includes an active sensor area located at a predetermined angular position with respect to an axis of rotation of a body being rotated in synchronization with the engine crankshaft and wherein said additional sensor means includes an additional active sensor area located at a different predetermined angular position with respect to said axis.

15. An electronic ignition timing advance circuit according to claim 14 wherein said ignition timing means includes a reset current source coupled to said capacitor and to said additional sensor, said reset current source being rendered operative by said pulse of said additional sensor for altering the charge on said capacitor to provide a minimum phase between said input signal and said spark timing ignition signal.

16. An electronic ignition timing advance circuit according to claim 1 which includes an additional sensor means for providing at least one pulse during each period of said input signal, said additional sensor means being coupled to said speed dependent ignition timing means and said pulse from said additional sensor means being utilized by said ignition timing means for providing a minimum possible difference in phase between said spark timing ignition signal and said output signal, whereby at least a minimum amount of phase exists between the spark timing ignition signal and the input signal regardless of the variable engine condition and the engine speed.

17. An electronic ignition timing advance circuit according to claim 16 wherein said sensor means including an active sensor are located at a predetermined angular position with respect to an axis of rotation of a body being rotated in synchronization with the engine crankshaft and said additional sensor means includes an additional active sensor area located at a different predetermined angular position with respect to said axis.

18. An electronic ignition timing advance circuit according to claim 1 wherein said pulse widths of said advance pulses are a predetermined proportion of the period of said input signal, that predetermined proportion being determined by said variable engine condition, whereby for a given engine condition said advance pulses adjust the spark timing signal by a constant amount of phase over a predetermined range of engine speed.

19. An electronic ignition timing advance circuit according to claim 2 wherein said variable engine condition is the vacuum pressure produced by the engine.

20. An electronic ignition timing advance circuit according to claim 3 wherein said engine vacuum pressure is the only variable engine condition which determines the proportion of said advance pulse widths to the period of said input signal.

* * * * *